United States Patent
Maier et al.

(10) Patent No.: US 10,428,292 B2
(45) Date of Patent: Oct. 1, 2019

(54) FUNCTIONAL POLYALKYL (METH)ACRYLATES WITH ENHANCED DEMULSIBILITY PERFORMANCE

(71) Applicant: Evonik Oil Additives GmbH, Darmstadt (DE)

(72) Inventors: Stefan Maier, Mainz (DE); Jürgen Gebhardt, Otzberg (DE); Katrin Schöller, Darmstadt (DE); Frank-Olaf Mähling, Mannheim (DE)

(73) Assignee: Evonik Oil Additives GmbH, Darmstadt (DE)

( * ) Notice: Subject to any disclaimer, the term of this patent is extended or adjusted under 35 U.S.C. 154(b) by 0 days.

(21) Appl. No.: 16/325,208

(22) PCT Filed: Aug. 9, 2017

(86) PCT No.: PCT/EP2017/070185
§ 371 (c)(1),
(2) Date: Feb. 13, 2019

(87) PCT Pub. No.: WO2018/033449
PCT Pub. Date: Feb. 22, 2018

(65) Prior Publication Data
US 2019/0203147 A1    Jul. 4, 2019

(30) Foreign Application Priority Data
Aug. 15, 2016 (EP) .................... 16184166

(51) Int. Cl.
| C10M 145/14 | (2006.01) |
| C10M 169/04 | (2006.01) |
| C08F 220/14 | (2006.01) |
| C08L 33/06 | (2006.01) |

(52) U.S. Cl.
CPC ......... *C10M 145/14* (2013.01); *C08F 220/14* (2013.01); *C10M 169/041* (2013.01); *C08F 2800/10* (2013.01); *C08L 33/066* (2013.01); *C10M 2203/003* (2013.01); *C10M 2203/1025* (2013.01); *C10M 2205/0285* (2013.01); *C10M 2209/084* (2013.01); *C10N 2220/021* (2013.01); *C10N 2220/022* (2013.01); *C10N 2230/02* (2013.01); *C10N 2230/24* (2013.01); *C10N 2240/08* (2013.01); *C10N 2270/02* (2013.01)

(58) Field of Classification Search
CPC ...................... C10M 145/14; C10M 2209/084
USPC ......................................................... 508/469
See application file for complete search history.

(56) References Cited

U.S. PATENT DOCUMENTS

| 5,851,967 A * | 12/1998 | Schauber ............. C08F 265/06 508/469 |
| 6,080,794 A | 6/2000 | Auschra et al. |
| 6,409,778 B1 | 6/2002 | Auschra et al. |
| 2004/0077509 A1 * | 4/2004 | Yuki ................... C10M 145/14 508/469 |
| 2005/0245406 A1 * | 11/2005 | Scherer ............... C10M 145/14 508/469 |
| 2005/0272617 A1 * | 12/2005 | Camenzind ........ C08F 293/005 508/469 |
| 2007/0219101 A1 * | 9/2007 | Scherer ............... C10M 107/28 508/469 |
| 2010/0009878 A1 * | 1/2010 | Baba .................... C10M 141/08 508/370 |
| 2010/0093576 A1 * | 4/2010 | Maruyama .......... C10M 161/00 508/370 |
| 2010/0167970 A1 * | 7/2010 | Stoehr ................. B01F 17/0028 508/469 |
| 2012/0108481 A1 * | 5/2012 | Nagatomi ........... C10M 145/14 508/496 |
| 2012/0142568 A1 * | 6/2012 | Ikai ..................... C10M 145/14 508/473 |
| 2013/0252866 A1 * | 9/2013 | Stoehr ..................... C08F 2/38 508/471 |

FOREIGN PATENT DOCUMENTS

| EP | 0 569 639 | 11/1993 |
| EP | 0 570 093 | 11/1993 |
| WO | 2008/053033 | 5/2008 |
| WO | 2010/142668 | 12/2010 |
| WO | 2011/006755 | 1/2011 |

OTHER PUBLICATIONS

International Search Report dated Dec. 1, 2017 in PCT/EP2017/070185.
Written Opinion dated Dec. 1, 2017 in PCT/EP2017/070185.

* cited by examiner

*Primary Examiner* — Ellen M McAvoy
(74) *Attorney, Agent, or Firm* — Grüneberg and Myers PLLC

(57) ABSTRACT

Polyalkyl(meth)acrylate (PAMA) polymers comprising a certain amount of hydroxyl-functionalized alkyl (meth)acrylates can be used for improving the demulsibility performance of high VI lubricating oil compositions. The lubricating oil compositions can be those which are based on apolar base oils, especially hydraulic fluid compositions. The polymers can be comprised in certain lubricating oil compositions.

22 Claims, No Drawings

FUNCTIONAL POLYALKYL (METH)ACRYLATES WITH ENHANCED DEMULSIBILITY PERFORMANCE

This application is a National Stage entry under § 371 of International Application No, PCT/EP2017/070185, filed on Aug. 9, 2017, and which claims the benefit of European Application No. 16181166.3, filed on Aug. 15, 2016.

The present invention is directed to new polyalkyl(meth) acrylate (PAMA) polymers comprising a certain amount of hydroxyl-functionalized alkyl (meth)acrylates, lubricating oil compositions comprising these polymers and their use for improving the demulsibility performance of high VI lubricating oil compositions which are based on apolar base oils, especially hydraulic fluid compositions.

The ability for water and oil to separate, also known as demulsibility, is an important factor in many industrial oils. The effects of water in oil can be very detrimental to machine surfaces and can greatly reduce machine life. This oil property must be closely monitored, especially in areas where water ingression is common (e.g. steam turbines, paper machines, etc.).

There are three states of water in oil: dissolved, free and emulsified. Dissolved water occurs when the molecules are dispersed one by one throughout the oil. As the amount of water in the oil increases, one begins to see emulsions, or water that is suspended in the oil, and then free water. Free water is the water that separates and settles out of the oil. It is typically found in the bottom of the sump or reservoir.

Water contamination in oil can cause multiple problems. It can lead to severe corrosion of metal parts and insufficient protection of the machinery by the oil film. Water can also have a negative impact on the base oil and the performance packages used in formulations. Aging of the oily mixture may be accelerated. Performance components may be deactivated by reaction with water which will result in insufficient protection of the pump against corrosion and wear.

It was now surprisingly found that polyalkyl (meth) acrylate-based viscosity index improvers comprising a certain amount of hydroxyl-functionalized alkyl (meth)acrylates lead to excellent demulsibility properties when used as an additive in lubricating oil compositions based on specific classes of base oils.

Polyalkyl (meth)acrylates (PAMAs) can be functionalized by copolymerization or grafting of monomers with polar functions and are commonly used to give the polymer dispersant functionality. Dispersancy is a feature often required in lubricants in order to keep soot and dirt from settling on machine elements or from blocking filters.

Dispersants are molecules with polar groups that can adsorb to polar particles and apolar parts that make the molecules oil soluble. PAMAs provide excellent oil solubility and are used in significant amounts as viscosity index improvers in lubricant formulations. These circumstances make it highly attractive to incorporate polar functions into the PAMA in order to add dispersant functionality.

Monomers that can be used to introduce dispersant functionality into a polyalkyl(meth)acrylate polymer usually contain nitrogen functions such as N-vinyl pyrrolidone (NVP), dimethylaminopropylmethacrylamide (DMAPMAm) or dimethylaminoethylmethacrylamine (DMAEMA), but also monomers with OH-functions like hydroxyethyl methacrylate (HEMA) or hydroxypropyl methacrylate (HPMA) can be used. Amino functions usually provide superior dispersancy performance while OH-functions also act as a performance ingredient boosting the viscosity index (VI) performance of the polymer.

WO 2011/006755 relates to lubricating composition for use in rolling contact or rolling and sliding contact systems such as roller bearings and gears. The lubricating composition described therein comprise a base oil (A) and a hydroxyl group-added poly(meth)acrylate (B). The hydroxyl group-added poly(meth)acrylate (B) are copolymers wherein the essential constituent monomers are alkyl(meth)acrylates having alkyl groups of 1 to 20 carbon atoms and vinyl monomers containing hydroxyl groups. 2-Hydroxyethyl methacrylate and 2- or 3-hydroxypropyl methacrylate are mentioned which have to be present in an amount of at least 5%.

US 2004/0077509 A1 relates to a viscosity index improver which comprises a copolymer (A) comprising 5-50% by weight of units of an unsaturated monomer (c) having at least one hydroxyl group. Such monomer (c) can be 2-hydroxyethyl methacrylate (HEMA).

WO 2010/142668 A1 relates to a lubricating composition of excellent water compatibility which comprise a base oil and a VI improver containing PAMA having hydroxyl groups in the structure and having a hydroxyl value of from 22 to 37. HEMA and HPMA (monomers (b)) are mentioned being present in an amount of 5-50 mass %.

WO 2008/053033 describes lubricating oil compositions, in particular transmission oils, comprising polyalkyl(meth) acrylates comprising methyl methacrylate (component (a1)) and OH-groups containing (meth)acrylates (component (b)). 2-Hydroxyethyl methacrylate and 2- or 3-hydroxy-propyl methacrylate are mentioned as preferred hydroxyalkyl (meth)acrylates which have to be present in an amount of at least 5%.

EP 0 569 639 A1 is concerned with polymers derived from alkyl methacrylates (component (a)) and hydroxyl $(C_{2-6})$ alkyl methacrylates (component (b)) which are useful as additives to lubricating oils for providing viscosity index improvement, dispersancy and low temperature performance properties without adversely affecting fluoropolymer seals and gaskets.

EP 0 570 093 A1 is concerned with polymers derived from (a) one or more monomer selected from (C1-C24)-alkyl (meth)acrylates and (b) one or more monomer selected from (C2-C6) alkyl methacrylates and hydroxy(C2-C6)alkyl methacrylates which are useful as ashless dispersant additives to lubricating oils for providing improved engine cleanliness and low temperature performance properties without adversely affecting fluoro-polymer seals and gaskets. Monomer (b) can be HEMA and has to be present in an amount of from 10 to about 30% by weight.

U.S. Pat. No. 5,851,967 is concerned with dispersant VI improving additives for lubricating oils. Graft polymers are described comprising 92-98% by weight of a polymer backbone derived from one or more (C1-C24)alkyl (meth) acrylate monomer and from 2-8% by weight grafted branches being derived from one or more hydroxyl(C1-C8) alkyl (meth)acrylate. HEMA and HPMA are mentioned as preferred monomers.

U.S. Pat. No. 6,409,778 B1 relates to a copolymer comprising 2 to 30% by weight of one or several oxygen-containing methacrylates which suitable as an additive for diesel fuel and biodiesel. Such oxygen-containing methacrylates can be HEMA or HPMA. The given working examples consist of more than 5% by weight of HEMA or HPMA.

Since the properties of the polyalkyl(meth)acrylates disclosed in the prior art are still unsatisfactory in relation to their use in hydraulic fluids, especially regarding their demulsibility properties, it was an aim of the present invention to provide polyalkyl(meth)acrylates which lead to excellent demulsibility performances of lubricating oil compositions which are based on apolar base oils, especially hydraulic fluid compositions.

For hydraulic fluids, dispersant PAMAs are only used in special applications. One of the reason for this is that dispersants have surfactant structures and will hinder the separation of oil and water which is a requirement for hydraulic fluids according to many standards such as ISO 11158, DIN 51524-3 and AFNOR NF E 48-603.

The more polar a PAMA is the more it will negatively influence the demulsibility performance, but it is possible to control this up to some degree by addition of demulsifiers to the formulation. However, using PAMAs with very polar groups as required for performance as a dispersant will in general ruin the demulsibility performance of an oil formulation.

It was now surprisingly found that small amounts of a hydroxyl-functionalized comonomer such as HEMA will have a completely opposite effect in formulations based on apolar base oils from API Groups II/III and IV. Such polymers show even better demulsibility performance than non-OH-functionalized PAMAs. In this way it is possible to combine functionality and good demulsibility performance in lubricant formulations in a highly efficient way.

In order to achieve this effect, only small amounts of the OH-functionalized monomer can be used and it has to be carefully balanced with other polar monomers such as methyl (meth)acrylate and butyl (meth)acrylate.

A first object of the present invention is therefore directed to a polyalkyl(meth)acrylate polymer, consisting of:
(a) 0% to 10% by weight, preferably 0% to 8% by weight, and more preferably 2% to 8% by weight, of methyl (meth)acrylate;
(b) 1.5% to 4.5% by weight, preferably 1.9% to 4.0% by weight, of a hydroxyl-substituted $C_{2-4}$ alkyl (meth)acrylate, preferably hydroxyethyl (meth)acrylate (HEMA) or hydroxypropyl (meth)acrylate (HPMA), more preferably hydroxyethyl methacrylate (HEMA); and
(c) 85.5% to 98.5% by weight, preferably 87.5% to 98.5% by weight, and more preferably 88.0% by weight to 96.1% by weight, of $C_{6-30}$ alkyl (meth)acrylates, preferably $C_{12-18}$ alkyl (meth)acrylates, wherein the weight-average molecular weight $M_w$ of the polyalkyl (meth)acrylate polymer is in the range of 30.000 to 130.000 g/mol.

The specified proportions by weight of components (a) to (c) are based on the total weight of the polyalkyl(meth) acrylate polymer.

In a preferred embodiment, the proportions of components (a) to (c) add up to 100% by weight.

The term "(meth)acrylate" refers to esters of acrylic acid, esters of methacrylic acid or mixtures of esters of acrylic acid and methacrylic acid. Esters of methacrylic acid are preferred.

Examples of hydroxyl-substituted $C_{2-4}$ alkyl (meth)acrylate (b) are alkyl (meth)acrylate monomers with one or more hydroxy groups in the alkyl radical, especially those where the hydroxyl group is found at the beta-position (2-position) in the alkyl radical. Hydroxyalkyl (meth)acrylate monomers in which the substituted alkyl group is a $C_{2-6}$ alkyl, branched or unbranched, are preferred. Among the hydroxyalkyl (meth)acrylate monomers suitable for use in the present invention are 2-hydroxyethyl acrylate, 2-hydroxyethyl methacrylate (HEMA), 2-hydroxypropyl acrylate, 2-hydroxypropyl methacrylate, 1-m ethyl-2-hydroxyethyl acrylate, 1-m ethyl-2-hydroxyethyl methacrylate, 2-hydroxybutyl acrylate and 2-hydroxybutyl methacrylate. The preferred hydroxyalkyl (meth)acrylate monomers are 2-hydroxyethyl methacrylate (HEMA), 1-methyl-2-hydroxyethyl methacrylate and 2-hydroxypropyl methacrylate. A mixture of the latter two monomers is commonly referred to as "hydroxypropyl methacrylate" or HPMA, which is a more preferred hydroxyalkyl methacrylate as are each of the components of the HPMA. According to the present invention, the most preferred hydroxyalkyl (meth)acrylate is HEMA.

The $C_{6-30}$ alkyl (meth)acrylates (component (c)) for use in accordance with the invention are esters of (meth)acrylic acid and alcohols having 6 to 30 carbon atoms. The term "$C_{6-30}$ alkyl (meth)acrylates" encompasses individual (meth)acrylic esters with an alcohol of a particular length, and likewise mixtures of (meth)acrylic esters with alcohols of different lengths.

The suitable $C_{6-30}$ alkyl (meth)acrylates include, for example, hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate.

Particularly preferred $C_{6-30}$ alkyl (meth)acrylates are selected from the group consisting of methacrylic esters of a linear $C_{12-14}$ alcohol mixture ($C_{12-14}$ alkyl methacrylate), methacrylic esters of a linear $C_{16-18}$ alcohol mixture ($C_{16-18}$ alkyl methacrylate) and mixtures thereof.

The weight-average molecular weight $M_w$ of the polyalkyl(meth)acrylate polymers according to the present invention is preferably in the range of 40.000 to 100.000 g/mol, more preferably of 40.000 to 95.000 g/mol, and even more preferably of 50.000 and 70.000 g/mol.

Preferably, the polyalkyl(meth)acrylate polymers according to the present invention have a polydispersity index (PDI) $M_w/M_n$ in the range of 1 to 4, more preferably in the range of from 1.5 to 3.

$M_w$ and $M_n$ are determined by size exclusion chromatography (SEC) using commercially available polymethylmethacrylate (PMMA) standards. The determination is accomplished by gel permeation chromatography with THF as eluent.

The present invention also relates to the use of the above-described functional polyalkyl(meth)acrylate polymers as viscosity index (VI) improvers which, at the same time, improve the demulsibility performance of high VI lubricating oil compositions based on apolar base oils, compared to other functional polyalkyl(meth)acrylate polymers.

Apolar base oils comprise the API Groups II, III and IV base oils and mixtures thereof; preference being given to API Group II oils and API Group III oils and mixtures thereof.

"High VI" means that the lubricating oil composition, including the polyalkyl(meth)acrylate polymer, has a VI in the range of 150 to 250, preferred in the range of 170 to 200.

The present invention further relates to a method of improving the VI and the demulsibility performance of lubricating oil compositions based on apolar base oils, especially of hydraulic fluid compositions, by applying a polyalkyl(meth)acrylate polymer as described above.

Preferably, by using the polyalkyl(meth)acrylate polymers according to the present invention, the VI of the corresponding lubricating oil composition is in the range of 150 to 250, preferred in the range of 170 to 200, whilst the time to demulse of said lubricating oil composition is 9 minutes or less, preferably 5 minutes or less.

A second object of the present invention is directed to an additive composition, comprising:
(A) an apolar base oil, and
(B) a polyalkyl(meth)acrylate polymer, comprising
   (a) 0% to 10% by weight, preferably 0% to 8% by weight, and more preferably 2% to 8% by weight, of methyl (meth)acrylate;
   (b) 1.5% to 4.5% by weight, preferably 1.9% to 4.0% by weight, of a hydroxyl-substituted $C_{1-4}$ alkyl (meth)acrylate, preferably hydroxyethyl (meth)acrylate (HEMA) or hydroxypropyl (meth)acrylate (HPMA), more preferably hydroxyethyl methacrylate (HEMA); and
   (c) 85.5% to 98.5% by weight, preferably 87.5% to 98.5% by weight, and more preferably 88.0% by weight to 96.1% by weight, of $C_{6-30}$ alkyl (meth) acrylates, preferably $C_{12-18}$ alkyl (meth)acrylates,
   wherein the weight-average molecular weight $M_w$ of the polyalkyl(meth)acrylate polymer is in the range of 30.000 to 130.000 g/mol.

The specified proportions by weight of components (A) and (B) are based on the total weight of the additive composition. In a preferred embodiment, the proportions of components (A) and (B) add up to 100% by weight.

The specified proportions by weight of components (a) to (c) are based on the total weight of the polyalkyl(meth) acrylate polymer. In a preferred embodiment, the proportions of components (a) to (c) add up to 100% by weight.

The apolar base oil to be used in the additive composition is preferably selected from the group consisting of API Group II oils, API Group III oils, API Group IV oils and mixtures thereof; preference being given to API Group II oils and API Group III oils and mixtures thereof.

The American Petroleum Institute (API) currently defines five groups of lubricant base stocks (API Publication 1509). Groups I, II and III are mineral oils which are classified by the amount of saturates and sulphur they contain and by their viscosity indices. The table below illustrates these API classifications for Groups I, II and III.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |

Group I base stocks are solvent refined mineral oils, which are the least expensive base stock to produce, and currently account for the majority of base stock sales. They provide satisfactory oxidation stability, volatility, low temperature performance and traction properties and have very good solvency for additives and contaminants.

Group II base stocks are mostly hydroprocessed mineral oils, which typically provide improved volatility and oxidation stability as compared to Group I base stocks.

Group III base stocks are severely hydroprocessed mineral oils or they can be produced via wax or paraffin isomerisation. They are known to have better oxidation stability and volatility than Group I and II base stocks but have a limited range of commercially available viscosities.

Group IV base stocks differ from Groups I, II and III in that they are synthetic base stocks comprising e.g. polyalphaolefins (PAOs). PAOs have good oxidative stability, volatility and low pour points. Disadvantages include moderate solubility of polar additives, for example antiwear additives.

Group II, III and IV oils are known for their exceptional stability towards oxidation and high temperatures, but they provide only limited solubility for polar additives such as friction modifiers.

More preferably, the base oil for use in accordance with the invention is a group II, III or IV oil as defined by the American Petroleum Institute or a mixture thereof, since the combination of the copolymer of the invention with a group II, III or IV oil or mixtures thereof leads to exceptional demulsibility performance of high VI lubricating oil formulations according to the present invention, especially hydraulic oil formulations.

Group II base oils have a viscosity index to ASTM D2270 of 80 to 120, a proportion of saturated compounds to ASTM D 2007 of at least 90% and a sulfur content to one of the standards ASTM D1552, D2622, D3120, D4294 and D4927 of not more than 0.03 percent. They are often manufactured by hydrocracking. A Group III oil has a viscosity index to ASTM D2270 of at least 120, a proportion of saturated compounds to ASTM D 2007 of at least 90 and a sulfur content to one of the standards ASTM D1552, D2622, D3120, D4294 and D4927 of not more than 0.03%. Group IV base stocks are polyalphaolefins (PAOs) (API 1509, Annex E—API Base Oil Interchangeability Guidelines for Passenger Car Motor Oils and Diesel Engine Oils, September 2011).

The kinematic viscosity at 100° C. ($KV_{100}$) of appropriate apolar base oils used to prepare the lubricant formulation is preferably in the range of 3 $mm^2/s$ to 10 $mm^2/s$, more preferably in the range of 4 $mm^2/s$ to 8 $mm^2/s$, according to ASTM D445.

Further apolar base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

The additive composition of the present invention comprises preferably 20% to 45% by weight of base oil (component (A)), preferably 25% to 40% by weight, based on the total weight of the additive composition.

The concentration of the polyalkyl(meth)acrylate polymer (component (B)) in the additive composition is preferably in the range from 55% to 80% by weight, more preferably in the range of 60% to 75% by weight, based on the total weight of the additive composition.

In a particular embodiment, the proportions of components (A) and (B) add up to 100% by weight.

The present invention further relates to the use of the above-described additive compositions as viscosity index (VI) improvers which, at the same time, improve the demulsibility performance of high VI lubricating oil compositions based on apolar base oils, compared to other functional polyalkyl(meth)acrylate polymers.

Apolar base oils comprise the API Groups II, III and IV base oils.

"High VI" means that the lubricating oil composition, including the polyalkyl(meth)acrylate polymer according to the present invention, has a VI in the range of 150 to 250, preferred in the range of 170 to 200.

The present invention further relates to a method of improving the VI and the demulsibility performance of lubricating oil compositions based on apolar base oils, especially of hydraulic fluid compositions, by applying an additive composition as described above.

Preferably, by applying the above-described additive compositions to lubricating oil compositions based on apolar base oils the corresponding final formulation has a time to demulse of less than 30 minutes, preferably less than 9 minutes.

A third object of the present invention is directed to a lubricating oil composition, comprising:
(A) 84% to 97% by weight of an apolar base oil;
(B) 3% to 16% by weight of a polyalkyl(meth)acrylate polymer, comprising:
  (a) 0% to 10% by weight, preferably 0% to 8% by weight, and more preferably 2% to 8% by weight, of methyl (meth)acrylate;
  (b) 1.5% to 4.5% by weight, preferably 1.9% to 4.0% by weight, of a hydroxyl-substituted $C_{1-4}$ alkyl (meth)acrylate, preferably hydroxyethyl (meth)acrylate (HEMA) or hydroxypropyl (meth)acrylate (HPMA), more preferably hydroxyethyl methacrylate (HEMA); and
  (c) 85.5% to 98.5% by weight, preferably 88.0% by weight to 96.1% by weight, of $C_{6-30}$ alkyl (meth) acrylates, preferably $C_{12-18}$ alkyl (meth)acrylates,
  wherein the polyalkyl(meth)acrylate polymer has a weight-average molecular weight $M_w$ in the range of 30.000 to 130.000 g/mol; and
(C) optionally one or more further additives.

The apolar base oil to be used in the lubricating oil composition is preferably selected from the group consisting of API Group II oils, API Group III oils, API Group IV oil and mixtures thereof; preference being given to API Group II oils and API Group III oils and mixtures thereof.

The specified proportions by weight of components (A) to (C) are based on the total weight of the lubricating oil composition. In a preferred embodiment, the proportions of components (A) to (C) add up to 100% by weight.

The specified proportions by weight of components (a) to (c) are based on the total weight of the polyalkyl(meth)acrylate polymer. In a preferred embodiment, the proportions of components (a) to (c) add up to 100% by weight.

The lubricating oil composition of the present invention comprises preferably 92% to 96% by weight of an apolar base oil (component (A)) and 4 to 8% by weight of the polyalkyl(meth)acrylate polymer (component (B)), based on the total weight of the additive composition.

The lubricating oil composition according to the invention may also contain, as component (C), further additives selected from the group consisting of pour point depressants, dispersants, defoamers, detergents, demulsifiers, antioxidants, antiwear additives, extreme pressure additives, friction modifiers, anticorrosion additives, dyes and mixtures thereof.

Preferred pour point depressants are, for example, selected from the group consisting of alkylated naphthalene and phenolic polymers, polyalkylmethacrylates, maleate copolymer esters and fumarate copolymer esters, which may conveniently be used as effective pour point depressants. The lubricating composition may contain 0.1% by weight to 0.5% by weight of a pour point depressant. Preferably, not more than 0.3% by weight of a pour point depressant is used.

Appropriate dispersants include poly(isobutylene) derivatives, for example poly(isobutylene)succinimides (PIBSIs), including borated PIBSIs; and ethylene-propylene oligomers having N/O functionalities.

Suitable defoaming agents include, for example, silicone oils, fluorosilicone oils, and fluoroalkyl ethers.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Preferred demulsifiers include alkyleneoxide copolymers and (meth)acrylates including polar functions.

The suitable antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

The preferred antiwear and extreme pressure additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds having sulfur and phosphorus, for example metal dithiophosphates, e.g. zinc di-$C_{3-12}$-alkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, α-pinene, polybutene, acrylic esters, maleic esters, triphenyl phosphorothionate (TPPT); compounds having sulfur and nitrogen, for example zinc bis(amyldithiocarbamate) or methylenebis(di-n-butyl dithiocarbamate); sulfur compounds with elemental sulfur and $H_2S$ sulfurized hydrocarbons (diisobutylene, terpene); sulfurized glycerides and fatty acid esters; overbased sulfonates; chlorine compounds or solids, such as graphite or molybdenum disulfide.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Some of the compounds listed above may fulfill multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Dispersants (including borated dispersants) are preferably used in a concentration of 0% to 2% by weight, defoamers in a concentration of 10 to 2500 ppm, detergents in a concentration of 0.05% to 1% by weight, demulsifiers in a concentration of 0% to 0.1% by weight, antioxidants in a concentration of 0.5% to 1.5% by weight, antiwear and extreme pressure additives each in a concentration of 0.1% to 1% by weight, friction modifiers in a concentration of 0.05% to 2% by weight, anticorrosion additives in a concentration of 0.05% to 0.5% by weight, and dyes in a concentration of 0.01% to 1% by weight. The concentration is based in each case on the total weight of the lubricating oil composition.

Preferably, the total concentration of the one or more additives (C) in a lubricating oil composition is up to 5% by weight, more preferably 0.1% to 4% by weight, more preferably 0.5% to 3% by weight, based on the total weight of the lubricating oil composition.

Further preferred contents of components (A), (B) and (C) in the lubricating oil compositions according to the present invention are as detailed in the following table:

| Lubricating Oil Composition | Component (A) [% by weight] | Component (B) [% by weight] | Component (C) [% by weight] |
| --- | --- | --- | --- |
| (1) | 79 to 97 | 3 to 16 | 0 to 5 |
| (2) | 87 to 96 | 4 to 8 | 0 to 5 |
| (3) | 80 to 96.9 | 3 to 16 | 0.1 to 4 |
| (4) | 88 to 95.9 | 4 to 8 | 0.1 to 4 |
| (5) | 81 to 96.5 | 3 to 16 | 0.5 to 3 |
| (6) | 89 to 95.5 | 4 to 8 | 0.5 to 3 |

According to the composition, the proportions by weight of components (A), (B) and (C) may add up to 100% by weight.

The present invention also relates to the use of the above-described lubricating oil composition as hydraulic fluid.

The present invention also relates to the above-described lubricating oil composition, which is characterized by its high VI in combination with excellent demulsibility performance.

The present invention therefore further relates to the lubricating oil composition described above, which preferably has a VI in the range of 150 to 230, preferably in the range of 170 to 220, and a time to demulse of 9 minutes or less.

The invention has been illustrated by the following non-limiting examples.

EXPERIMENTAL PART

Abbreviations

KV kinematic viscosity measured according to ASTM D445
$KV_{40}$ kinematic viscosity measured @40° C. to ASTM D445
$KV_{100}$ kinematic viscosity measured @100° C. to ASTM D445
HEMA hydroxyethyl methacrylate
HPMA hydroxypropyl methacrylate
MMA methyl methacrylate
NB 3020 Nexbase® 3020, Group III base oil from Neste with a $KV_{100}$ of 2.2 cSt
NB 3043 Nexbase® 3043, Group III base oil from Neste with a $KV_{100}$ of 4.3 cSt
NB 3080 Nexbase® 3080, Group III base oil from Neste with a $KV_{100}$ of 7.9 cSt
100R Group II base oil from Chevron with a $KV_{100}$ of 4.1 cSt
220R Group II base oil from Chevron with a $KV_{100}$ of 6.4 cSt
Esso 100 Sentinel® 619, Group I base oil obtained from Univar
Esso 150 Sentinel® 847, Group I base oil obtained from Univar
Esso 600 Sentinel® 876, Group I base oil obtained from Univar
DDM dodecanethiol
DPMA Methacrylate made from synthetic $C_{12-15}$ mixture, 21% $C_{12}$, 29% $C_{13}$, 29% $C_{14}$, 21% $C_{15}$; 76% linear
CEMA cetyl-eicosyl methacrylate, 52% $C_{16}$, 31% $C_{18}$, 13% $C_{20}$, 4% others; all linear
LMA lauryl methacrylate, 73% $C_{12}$, 27% $C_{14}$; all linear
SMA stearyl methacrylate, 33% $C_{16}$, 67% $C_{18}$; all linear
Sty styrene
$M_w$ weight-average molecular weight
PDI Polydispersity index
Hitec® 521 DI Package commercially available from Afton
VPL 1-333 VISCOPLEX® 1-333, pour point depressant commercially available from Evonik
Test Methods The polymers according to the present invention and the comparative examples were characterized with respect to their molecular weight and PDI.

Molecular weights were determined by size exclusion chromatography (SEC) using commercially available polymethylmethacrylate (PMMA) standards. The determination is effected by gel permeation chromatography with THF as eluent (flow rate: 1 mL/min; injected volume: 100 μl).

The additive compositions and lubricating oil compositions including the polyalkyl(meth)acrylate polymers according to the present invention and comparative examples were characterized with respect to kinematic viscosity at 40° C. ($KV_{40}$) and 100° C. ($KV_{100}$) to ASTM D445, the viscosity index (VI) to ASTM D2270 and demulsibility (time to demulse).

Samples for use in measuring viscosity index were formulated by adding an amount of a respective one of the compositions to apolar oils effective to provide a kinematic viscosity of about 46 mm²/s (cSt) at 40° C. The viscosity index of each of the samples was determined according to ASTM method D2270 by comparing the respective kinematic viscosities at 40° C. and 100° C. Results are set forth in Tables 4, 6 and 8 as VI.

Samples for use in measuring demulsibility were formulated by adding an amount of a respective one of the compositions to apolar oils effective to provide a kinematic viscosity of about 46 mm²/s (cSt) at 40° C. The demulsibility of each of the samples was characterized by the method of ASTM D 1401 Standard Test Method for Water Separability of Petroleum Oils and Synthetic Fluids. 40 mL of fluid are mixed with 40 mL of water at 54° C. Time given is the time until no more than 3 mL of emulsion are left. Test is stopped after 30 minutes as less than 30 minutes is required for hydraulic fluids according to ISO 11158. Results are set forth below in Tables 4, 6 and 8 as the respective time to demulse given in minutes.

Polymer Synthesis

Example for a Product with 3.5% HEMA and 8% MMA (Example 2)

A round-bottom flask equipped with a glass stir rod, nitrogen inlet, reflux condenser and thermometer was charged with 218.07 g of Group III oil supplied by Neste, 511.2 g $C_{12}/C_{14}$-methacrylate, 20.2 g hydroxyethylmethacrylate (HEMA), 46.2 g methyl methacrylate and 3.75 g chain transfer agent (DDM). The mixture was heated up to 110° C. while stirring and nitrogen bubbling for inertion. Then 3-stage feed for 3 hours feed of a mixture consisting of 1.44 g tert-butyl-perhexanoate and 4.33 g Group III oil supplied by Neste was started. After the feed end the mixture was stirred for an additional 60 minutes. After addition of 1.16 g tert-butyl-perhexanoate the mixture was stirred for an additional 60 minutes.

All other polyalkyl(meth)acrylate polymers were prepared by radical polymerization in oil as described in the synthesis procedure of Example 2. Group II and III dilution oils were used in the examples with respect to their future use in Group II or III formulations. As the dilution oil of the polymer will be only a minor part of a final formulation, dilution oils from other base oil classes as group I, IV and V are possible.

Modifications of the procedure are noted in Table 1. The monomer components will add up to 100%. The amounts of DDM and dilution oil are given relative to the total amount of monomers.

TABLE 1

Compositions of reaction mixtures used for preparation of the polyalkyl(meth)acrylate polymers according to the present invention

| Polymer | Monomers used | | | | | Reaction conditions | Dilution oil | |
|---|---|---|---|---|---|---|---|---|
| Example # | HEMA [wt. %] | HPMA [wt. %] | MMA [wt. %] | LMA [wt. %] | SMA [wt. %] | DDM [wt. %] | NB 3020 [wt. %] | 100R [wt. %] |
| 1 | 2.5 | | 5.0 | 92.5 | | 0.65 | 28 | |
| 2 | 3.5 | | 8.0 | 88.5 | | 0.65 | 28 | |
| 3 | 2.3 | | 5.5 | 92.2 | | 0.65 | 28 | |
| 4 | 3.5 | | 3.0 | 93.5 | | 0.65 | 28 | |
| 5 | 4.5 | | 6.0 | 89.5 | | 0.65 | 28 | |
| 6 | 3.0 | | | 97.0 | | 0.65 | 28 | |
| 7 | 3.0 | | 2.0 | 95.0 | | 0.65 | 28 | |
| 8 | 1.9 | | 8.0 | 90.1 | | 0.65 | 28 | |
| 9 | 1.9 | | 5.0 | 93.1 | | 0.65 | 28 | |
| 10 | 3.0 | | | 97.0 | | 0.30 | 28 | |
| 11 | 3.0 | | 5.0 | 92.0 | | 0.30 | 28 | |
| 12 | 3.0 | | 5.0 | 92.0 | | 1.20 | 28 | |
| 13 | 3.0 | | 5.0 | 92.0 | | 0.40 | 28 | |
| 14 | 3.0 | | | 71.8 | 25.2 | 0.55 | 31 | |
| 15 | 3.0 | | 7.0 | 66.6 | 23.4 | 0.55 | 31 | |
| 16 | 2.5 | | 5.0 | 92.5 | | 0.70 | | 28 |
| 17 | 4.0 | | 5.0 | 91.0 | | 0.65 | | 28 |
| 18 | 2.5 | | 5.0 | 92.5 | | 0.30 | | 34 |
| 19 | 4.0 | | 5.0 | 91.0 | | 0.30 | | 34 |
| 20 | | 3.0 | 5.0 | 92.0 | | 0.65 | | 28 |
| 21 (Comp.) | | | | 100.0 | | 0.75 | 28 | |
| 22 (Comp.) | | | 10.0 | 90.0 | | 0.75 | 28 | |
| 23 (Comp.) | 5.0 | | 10.0 | 85.0 | | 0.60 | 28 | |
| 24 (Comp.) | 5.0 | | | 95.0 | | 0.60 | 28 | |
| 25 (Comp.) | 1.0 | | 8.0 | 91.0 | | 0.65 | 28 | |
| 26 (Comp.) | 1.0 | | 3.0 | 96.0 | | 0.65 | 28 | |

TABLE 1-continued

Compositions of reaction mixtures used for preparation of the polyalkyl(meth)acrylate polymers according to the present invention

| Polymer Example # | Monomers used | | | | | Reaction conditions | Dilution oil | |
|---|---|---|---|---|---|---|---|---|
| | HEMA [wt. %] | HPMA [wt. %] | MMA [wt. %] | LMA [wt. %] | SMA [wt. %] | DDM [wt. %] | NB 3020 [wt. %] | 100R [wt. %] |
| 27 (Comp.) | 3.0 | | 10.0 | 87.0 | | 0.65 | 28 | |
| 28 (Comp.) | 6.0 | | 6.0 | 88.0 | | 0.30 | 28 | |
| 29 (Comp.) | 5.0 | | | 70.3 | 24.7 | 0.55 | 31 | |
| 30 (Comp.) | 5.0 | | 5.0 | 66.6 | 23.4 | 0.55 | 31 | |

The polymers prepared according to the present invention comprise defined amounts of hydroxy-functionalized alkyl (meth)acrylates.

The net compositions of the resulting polyalkyl(meth)acrylate polymers and their characteristic weight-average molecular weights $M_w$ as well as their polydispersity indices are given in the following Table 2.

TABLE 2

Net compositions of polyalkyl(meth)acrylate polymers prepared according to the present invention (monomer components add up to 100%), their molecular weight and PDI

| Polymer Example | HEMA [wt. %] | HPMA [wt. %] | MMA [wt. %] | LMA [wt. %] | SMA [wt. %] | $M_w$ [g/mol] | PDI |
|---|---|---|---|---|---|---|---|
| 1 | 2.5 | | 5.0 | 92.5 | | 56100 | 2.1 |
| 2 | 3.5 | | 8.0 | 88.5 | | 59800 | 2.1 |
| 3 | 2.3 | | 5.5 | 92.2 | | 58100 | 2.1 |
| 4 | 3.5 | | 3.0 | 93.5 | | 58700 | 2.1 |
| 5 | 4.5 | | 6.0 | 89.5 | | 59100 | 2.1 |
| 6 | 3.0 | | | 97.0 | | 56400 | 2.1 |
| 7 | 3.0 | | 2.0 | 95.0 | | 56000 | 2.0 |
| 8 | 1.9 | | 8.0 | 90.1 | | 58900 | 2.0 |
| 9 | 1.9 | | 5.0 | 93.1 | | 56100 | 2.1 |
| 10 | 3.0 | | | 97.0 | | 125000 | 2.6 |
| 11 | 3.0 | | 5.0 | 92.0 | | 118000 | 2.6 |
| 12 | 3.0 | | 5.0 | 92.0 | | 32100 | 1.9 |
| 13 | 3.0 | | 5.0 | 92.0 | | 92100 | 2.3 |
| 14 | 3.0 | | | 71.8 | 25.2 | 69700 | 2.2 |
| 15 | 3.0 | | 7.0 | 66.6 | 23.4 | 71300 | 2.2 |
| 16 | 2.5 | | 5.0 | 92.5 | | 55900 | 2.1 |
| 17 | 4.0 | | 5.0 | 91.0 | | 58800 | 2.0 |
| 18 | 2.5 | | 5.0 | 92.5 | | 117000 | 2.5 |
| 19 | 4.0 | | 5.0 | 91.0 | | 124000 | 2.6 |
| 20 | | 3.0 | 5.0 | 92.0 | | 59100 | 2.1 |
| 21 (Comp.) | | | | 100.0 | | 48800 | 2.0 |
| 22 (Comp.) | | | 10.0 | 90.0 | | 49400 | 2.1 |
| 23 (Comp.) | 5.0 | | 10.0 | 85.0 | | 64800 | 2.2 |
| 24 (Comp.) | 5.0 | | | 95.0 | | 62300 | 2.1 |
| 25 (Comp.) | 1.0 | | 8.0 | 91.0 | | 55000 | 2.2 |
| 26 (Comp.) | 1.0 | | 3.0 | 96.0 | | 54500 | 2.2 |
| 27 (Comp.) | 3.0 | | 10.0 | 87.0 | | 59500 | 2.1 |
| 28 (Comp.) | 6.0 | | 6.0 | 88.0 | | 138000 | 2.7 |
| 29 (Comp.) | 5.0 | | | 70.3 | 24.7 | 69200 | 2.1 |
| 30 (Comp.) | 5.0 | | | 66.6 | 23.4 | 71100 | 2.2 |

Polymer Examples 1 to 20 are working examples and comprise the hydroxyl-substituted $C_{1-4}$ alkyl (meth)acrylate (HEMA or HPMA) and methyl methacrylate in amounts specified in the present invention.

Polymer Examples 21 to 30 are comparative examples and comprise the hydroxyl-substituted $C_{1-4}$ alkyl (meth)acrylate (HEMA or HPMA) and/or methyl methacrylate in amounts which are outside the ranges as specified in the present invention.

To demonstrate the effect of the polyalkyl(methacrylate) polymers according to the present invention on the demulsibility performance of lubricating compositions, different formulation examples were prepared.

Formulation Examples A

The following Table 3 shows the composition of Formulations A1-A20, each comprising one of the polyalkyl(meth)acrylates as presented in Table 2 and a base oil, which were formulated to a $KV_{40}$ of about 46 mm²/s. As apolar base oil was used a mixture of NB 3043 (Group III base oil with a $KV_{100}$ of 4.3 cSt) and NB 3080 (Group III base oil with a $KV_{100}$ of 7.9 cSt).

Formulations A1 to A11 are working examples and comprise the polyalkyl(meth)acrylates according to the present invention (Polymer Examples 1-20).

Formulations A12 to A20 are comparative examples as they comprise polyalkyl(meth)acrylates which compositions are outside the ranges as disclosed and claimed in the present invention (Polymer Examples 21-30).

TABLE 3

Additive compositions A prepared according to the present invention

| Formulation # | Polymer # | Treat rate [%] | NB 3043 Oils [%] | NB 3080 [%] |
|---|---|---|---|---|
| A1 | Example 1 | 8.8 | 48.0 | 43.2 |
| A2 | Example 2 | 9.0 | 42.8 | 48.2 |
| A3 | Example 3 | 8.9 | 45.1 | 46.0 |
| A4 | Example 6 | 8.9 | 45.1 | 46.0 |
| A5 | Example 7 | 8.9 | 45.1 | 46.0 |
| A6 | Example 8 | 8.3 | 43.0 | 48.7 |
| A7 | Example 9 | 8.9 | 46.1 | 45.0 |
| A8 | Example 14 | 8.2 | 44.0 | 47.8 |
| A9 | Example 15 | 7.7 | 39.4 | 52.9 |
| A10 | Example 16 | 9.2 | 47.0 | 43.8 |
| A11 | Example 20 | 8.7 | 47.0 | 44.3 |
| A12*) | Example 21 (Comp.) | 10.4 | 52.6 | 37.0 |
| A13*) | Example 22 (Comp.) | 9.4 | 46.6 | 44.0 |
| A14*) | Example 23 (Comp.) | 8.5 | 40.5 | 51.0 |
| A15*) | Example 24 (Comp.) | 8.7 | 48.3 | 43.0 |
| A16*) | Example 25 (Comp.) | 9.6 | 48.3 | 42.1 |
| A17*) | Example 26 (Comp.) | 9.6 | 51.2 | 39.2 |
| A18*) | Example 27 (Comp.) | 8.7 | 42.0 | 49.3 |
| A19*) | Example 29 (Comp.) | 8.4 | 41.3 | 50.2 |
| A20*) | Example 30 (Comp.) | 8.3 | 40.2 | 51.5 |

*) = comparative examples

The PAMA VI improvers according to the present invention consist mainly of comparably apolar methacrylates such as LMA to generate an oil soluble polymer.

In solution most polymers form of a spherical coil. The superior VI performance of PAMAs is a result of the change in hydrodynamic radius of the coil with temperature. The highly polar backbone is poorly solved at low temperatures which results in a relatively small polymer coil. With increasing temperatures the solvency of the oil increases, the backbone is better dissolved and the coil gets bigger. This change in hydrodynamic radius correlates with the thickening contribution of the polymer. In order to increase this effect and to shift it into the desired temperature window the polarity of the polymer can be adjusted. Polar monomers like MMA, BMA and also HEMA will reduce the solubility of the backbone and therefore contribute to a more contracted polymer backbone.

As the VI effect gets more pronounced polar monomers reduce the amount of polymer required to reach a certain VI (viscosity index) level, i.e. they reduce the treat rate of the VI improver. Table 3 shows that the treat rates of the polymers comprising small amounts of polar monomers have a lower treat rate (Formulations A1 to A11: treat rate is between 7.7 and 9.2%) than very apolar PAMA like e.g. Formulation A12 which comprises Polymer Example 21.

A lower VI improver treat rate is highly desired as it is much more expensive than mineral oil. State of the art are therefore PAMAs with increased backbone polarity. As can be seen in the comparison of the formulations A12 and A13, the even 10% of the polar monomer MMA reduces the treat rate by 10%. The effect is further increased in the final application as more contracted polymers will be also less vulnerable to shear forces which allows the use of higher molecular weight polymers which will further reduce the treat rate.

The high-polarity backbones also have several drawbacks which limit the applicability of this approach. For hydraulic fluids the main challenge is the influence on the demulsibility performance according to standards such as ISO 11158. A more polar backbone will result in a more surfactant-like chemical structure of the polymer with pronounced polar and apolar parts. These polymers are able to stabilize water in oil emulsions and water will not separate from the oil.

Demulsifiers can be used to overcome this effect sometimes, but these polar components have other unwanted side-effects as their activity is not limited to the water/oil interface.

No demulsifiers are used in the examples according to the present invention as the demulsibility performance is controlled via the polymer composition.

The effect of the different polyalkyl(meth)acrylates on the demulsibility is presented in Table 4 as the "Time to Demulse". Additionally, $KV_{100}$ and viscosity index (VI) of the formulations are also given.

TABLE 4

Formulation properties of the additive compositions A prepared according to the present invention demonstrating the effect of monomer composition on the demulsification performance

| Formulation # | $KV_{40}$ [cSt] | $KV_{100}$ [cSt] | VI | Time to Demulse [min] |
|---|---|---|---|---|
| A1 | 46.7 | 9.1 | 180 | 2.0 |
| A2 | 46.6 | 9.1 | 182 | 6.7 |
| A3 | 46.5 | 9.1 | 182 | 4.0 |
| A4 | 46.4 | 9.0 | 180 | 4.7 |
| A5 | 46.1 | 9.0 | 180 | 4.7 |
| A6 | 46.2 | 9.0 | 180 | 2.3 |
| A7 | 46.2 | 9.0 | 180 | 3.1 |
| A8 | 46.8 | 9.1 | 181 | <5 |
| A9 | 46.3 | 9.0 | 180 | <5 |
| A10 | 46.7 | 9.1 | 182 | 4.4 |
| A11 | 46.2 | 9.0 | 181 | 8.2 |
| A12*) | 46.4 | 9.0 | 178 | 9.6 |
| A13*) | 46.5 | 9.0 | 179 | >30 |
| A14*) | 46.0 | 8.9 | 178 | >30 |
| A15*) | 46.3 | 9.1 | 181 | >30 |
| A16*) | 47.0 | 9.2 | 182 | >30 |
| A17*) | 46.5 | 9.1 | 181 | >30 |
| A18*) | 46.2 | 9.0 | 181 | >30 |
| A19*) | 46.2 | 9.0 | 181 | 20.0 |
| A20*) | 46.1 | 9.0 | 181 | >30 |

*) = comparative examples

Hydroxy-functionalized monomers can be considered as an extreme case of a polar monomer unit as hydrogen bonding will contribute massively to contraction of the polymers in apolar oils. For this reason, monomers such as HEMA and HPMA are expected to have a strong negative effect on demulsification performance. This effect can be observed both at high and low concentrations of these hydroxy-functionalized monomers, but surprisingly there is a certain range of rather low concentrations in which even the opposite effect can be observed in apolar base oils from groups II and III.

As can be seen from Table 4, Formulation A12 using Polymer Example 21 as polymer product shows average demulsification performance (time to demulse=9.6 minutes), while excellent results are obtained with polymers containing 1.5-4.5% HEMA and not more than 9% MMA. Poor results are for example obtained with formulations A16 (using Polymer Example 25) and A17 (using Polymer Example 26) with an amount of HEMA of only 1% by weight (time to demulse>30 minutes).

They demonstrate that the demulsifying effect is induced by a certain amount of hydroxyl functions. As described before, a high backbone polarity induced by polar monomers is desirable. If HEMA is used according to this invention, it can be combined with MMA to improve the performance of the polymer as VI improver. Comparison of the formulations comprising one of the two high MMA polymers, Formulation A2 (3.5% HEMA and 8% MMA) and Formulation A6 (1.9% HEMA and 8% MMA) with formulations comprising polymer Example 25 (1% HEMA and 8% MMA), Formulation 16, and polymer Example 27 (3% HEMA and 10% MMA), Formulation A18, shows that only a careful balance of MMA and HEMA will lead to optimum results. Formulations A2 (with polymer Example 2) and A6 (with polymer Example 8) both show very low times to demulse of 2.0 and 2.3 minutes, whereas formulations A16 (with polymer Example 25) and A18 (with polymer Example 27) both show times to demulse of >30 minutes which equals a failure in the test procedure.

Formulation Examples B

To demonstrate the superior effect of the polyalkyl(meth)acrylates according to the present invention on API Group II and/or Group III oils in contrast to Group I oils, lubricating oil compositions B with different oil mixtures are prepared. Details are outlined in the following Table 5.

Table 6 compares the demulsification performance of the polymers, which are prepared in accordance with the present invention, in different base oils, formulated to a $KV_{40}$ of 46 $mm^2/s$.

TABLE 6

Formulation properties of lubricating oil compositions B according to the present invention, prepared with different oil mixtures

| Formulation # | Formulation Properties | | | |
|---|---|---|---|---|
| | $KV_{40}$ [$mm^2/s$] | $KV_{100}$ [$mm^2/s$] | VI | Time to Demulse [min] |
| B1 | 46.7 | 9.1 | 180 | 2.0 |
| B2 | 46.5 | 9.1 | 180 | 0.5 |
| B3*) | 46.0 | 9.0 | 180 | >30 |
| B4 | 46.8 | 9.1 | 181 | <5 |
| B5*) | 46.4 | 9.1 | 181 | >30 |
| B6*) | 45.9 | 9.0 | 180 | >30 |
| B7 | 46.3 | 9.0 | 180 | <5 |
| B8 | 46.7 | 9.1 | 182 | 4.4 |
| B9 | 49.3 | 9.0 | 165 | 4.8 |

*) = comparative examples

Table 6 clearly shows that while excellent values are obtained in the apolar Group II and Group III base oils (see Formulations B1, B2, B4, B7, B8 and B9 with Time to Demulse<5 minutes), a very poor performance is observed in Group I formulations (see Formulations B3 and B6 with Time to Demulse>30 minutes). Also mixtures of Group I and Group III base oils do not show an improvement (see

TABLE 5

Lubricating oil compositions B according to the present invention, prepared with different base oil mixtures

| | | | Group I Oils | | | | Group III Oils | | Other components | |
|---|---|---|---|---|---|---|---|---|---|---|
| | Product | | Esso | Esso | Esso | Group II Oils | | NB | NB | Hitec | VPL |
| Formulation # | Polymer Example # | Treat rate [wt %] | 100 [wt %] | 150 [wt %] | 600 [wt %] | 100R [wt %] | 220R [wt %] | 3043 [wt %] | 3080 [wt %] | 521 [wt %] | 1-333 [wt %] |
| B1 | 1 | 8.8 | | | | | | 48.0 | 43.2 | | |
| B2 | 1 | 11.0 | | | | 47.0 | 42.0 | | | | |
| B3*) | 14 | 10.5 | 76.0 | | 13.5 | | | | | | |
| B4 | 14 | 8.2 | | | | | | 44.0 | 47.8 | | |
| B5*) | 14 | 10.3 | | 58.0 | | | | 31.7 | | | |
| B6*) | 15 | 9.9 | 73.2 | | 16.9 | | | | | | |
| B7 | 15 | 7.7 | | | | | | 39.4 | 52.9 | | |
| B8 | 16 | 9.2 | | | | | | 47.0 | 43.8 | | |
| B9 | 16 | 9.0 | | | | 35.0 | 54.9 | | | 0.9 | 0.2 |

*) = comparative examples

Formulations B1 to B9 comprise one of the Polymer Examples in accordance with the present invention and either API Group I base oil (Formulations B3 and B6, which are comparative examples), Group II base oils (Formulations B2 and B9), Group III base oils (Formulations B1, B4, B7 and B8) or mixtures of Group I and Group III base oils (Formulation B5). Formulation B9 does additionally comprise a DI package (Hitec® 521) and a PAMA pour point depressant (VPL 1-333) in order to show the applicability of the present invention to a typical state of the art hydraulic formulation.

Formulation B5 with Time to Demulse>30 minutes). Formulation B9 represents a fully formulated oil, comprising additionally a DI package and a PAMA pour point depressant. Despite the polar nature of the DI package components, their influence on the demulsification properties of the formulation with HEMA-containing PAMA seems to be minimal.

Formulation Examples C

A superior effect of the polyalkyl(meth)acrylates according to the present invention on API Group II and/or Group III oil formulations can also be shown with regard to different treat rates. Therefore, lubricating oil compositions C are prepared.

TABLE 7

Lubricating oil compositions C according to the present invention with different treat rates

| Formulation # | Polymer Product | | Oils | | |
|---|---|---|---|---|---|
| | Polymer Example # | Polymer Treat rate [wt %] | treat rate [wt %] | NB 3020 [wt %] | NB 3043 [wt %] | NB 3080 [wt %] |

| Formulation # | Polymer Example # | Polymer Treat rate [wt %] | Polymer treat rate [wt %] | NB 3020 [wt %] | NB 3043 [wt %] | NB 3080 [wt %] |
|---|---|---|---|---|---|---|
| C1 | 10 | 4.8 | 3.5 | | 40.2 | 55.0 |
| C2 | 11 | 5.1 | 3.7 | | 40.0 | 54.9 |
| C3 | 11 | 7.3 | 5.3 | | 54.7 | 38.0 |
| C4 | 11 | 9.8 | 7.1 | | 74.2 | 16.0 |
| C5 | 11 | 4.1 | 3.0 | | 75.0 | 20.9 |
| C6 | 12 | 14.5 | 10.4 | | 52.0 | 33.5 |
| C7 | 12 | 22.3 | 16.1 | 5.0 | 72.7 | |
| C8 | 12 | 11.8 | 8.5 | | 84.2 | 4.0 |
| C9 | 13 | 6.0 | 4.3 | | 39.0 | 55.0 |
| C10 | 13 | 8.6 | 6.2 | | 54.9 | 36.5 |
| C11 | 13 | 4.8 | 3.5 | | 74.2 | 21.0 |
| C12 | 1 | 8.8 | 6.3 | | 48.0 | 43.2 |
| C13 | 1 | 13.0 | 9.4 | | 65.0 | 22.0 |
| C14 | 1 | 17.2 | 12.4 | 39.8 | | 43.0 |
| C15 | 1 | 7.1 | 5.1 | | 78.9 | 14.0 |
| C16 | 1 | 11.5 | 8.3 | | 13.0 | 75.5 |
| C17*) | Ex 28 (Comp.) | 5.2 | 3.7 | | 35.0 | 59.8 |

*) = comparative examples

Table 8 compares formulation examples C with different treat rates of the polymers according to the present invention due to different viscosity, VI and time to demulse.

The different compositions are formulated to a $KV_{40}$ of 32 mm²/s, 46 mm²/s or 68 mm²/s which relates to the most important ISO viscosity classes for hydraulic fluids.

TABLE 8

Formulation properties of lubricating oil compositions C according to the present invention with different treat rates

| Formulation # | Formulation Properties | | | |
|---|---|---|---|---|
| | $KV_{40}$ [cSt] | $KV_{100}$ [cSt] | VI | Time to Demulse [min] |
| C1 | 46.2 | 9.0 | 180 | 8.3 |
| C2 | 46.2 | 9.0 | 182 | 9.0 |
| C3 | 46.8 | 9.7 | 199 | 8.2 |
| C4 | 46.7 | 10.4 | 219 | 4.6 |
| C5 | 32.6 | 6.9 | 180 | 5.0 |
| C6 | 46.6 | 9.1 | 180 | 4.1 |
| C7 | 46.6 | 9.7 | 200 | 13.8 |
| C8 | 32.4 | 6.9 | 181 | 8.0 |
| C9 | 46.4 | 9.1 | 181 | 13.7 |
| C10 | 46.6 | 9.7 | 199 | 11.4 |
| C11 | 32.5 | 6.9 | 180 | 7.2 |
| C12 | 46.7 | 9.1 | 180 | 2.0 |
| C13 | 46.8 | 9.7 | 200 | 3.2 |
| C14 | 46.4 | 10.4 | 220 | 6.0 |
| C15 | 32.4 | 6.9 | 181 | 1.5 |
| C16 | 68.3 | 12.2 | 179 | 7.1 |
| C17* | 46.2 | 9.0 | 180 | >30 |

*) = comparative examples

As expected, very high polymer treat rates as with the low molecular weight Polymer Example 12 (Formulations C6, C7 and C8) show longer, but still good times for demulsification.

Surprisingly, also lower treat rates of the high molecular weight Polymer Examples 10, 11 and 13 (Formulations C1-C5 and C9-C11) show a similar effect, and demulsification performance even improves if more polymer is added to reach a higher VI. Counterbalancing the lower polymer treat rate by a higher HEMA content as shown with Formulation C17 (using Polymer Example 28) is not possible (time to demulse>30 minutes). This indicates that the origin of the effect can be found in the balance between polar and apolar parts within the polymeric chain.

To further show the importance of a careful balance of MMA and HEMA in PAMA polymers to receive a high VI compared to excellent demulsibilty performance of lubricating oil compositions, the following examples were prepared in accordance with state of the art literature.

Example (a) corresponds to Example 1 as disclosed in EP 0 569 639 A1 and was prepared following the protocol disclosed therein (see page 8, lines 35-54).

Example (b) corresponds to Example 3 as disclosed in EP 0 569 639 A1 and was prepared following the protocol disclosed therein (see page 9, lines 13-32).

Example (c) corresponds to Example 1 as disclosed in U.S. Pat. No. 5,851,967 and was prepared following the protocol disclosed therein (see columns 5 and 6).

Example (d) corresponds to Example 2 as disclosed in U.S. Pat. No. 5,851,967 and was prepared following the protocol disclosed therein (see columns 5 and 6).

Example (e) corresponds to Example 1 as disclosed in U.S. Pat. No. 6,409,778 and was prepared following the protocol disclosed therein (see columns 5 and 6).

Example (f) corresponds to Polymer C disclosed under Example 6 of EP 0569639 A1 (see page 11). It was prepared following the protocol given under Example 1 of EP 0569639 A1 (see page 8).

Therein, a paraffinic oil base stock, a 100N oil, was used as solvent.

The weight-average molecular weight of the resulting polymer (f) is 140.000 g/mol and the PDI is 2.87.

TABLE 9

PAMA polymers prepared according to the protocols disclosed in the state of the art documents (the monomer components will add up to 100%).

| # | Example | HEMA [wt. %] | HPMA [wt. %] | MMA [wt. %] | $C_{10}$ AMA* [wt. %] | DPMA $C_{12-15}$ [wt. %] | CEMA $C_{16/18/20}$ [wt. %] | SMA $C_{16/18}$ [wt. %] | Sty [wt. %] |
|---|---|---|---|---|---|---|---|---|---|
| (a) | Example 1 of EP 0569639A1 | | 5 | 10 | 55 | | 30 | | |
| (b) | Example 3 of EP 0569639A1 | | 5 | 5 | 85 | | 5 | | |
| (c) | Example 1 of U.S. Pat. No. 5,851,967 | | 4.0 | 26.5 | | | | 39.3 | 30.2 |
| (d) | Example 2 of U.S. Pat. No. 5,851,967 | | 3.1 | 26.7 | | | | 39.7 | 30.5 |
| (e) | Example 1 of U.S. Pat. No. 6,409,778 | 6.0 | | | | 79.3 | | 14.7 | |
| (f) | Example 6-C of EP 0569639A1 | | 4.0 | 8.0 | 88.0 | | | | |

*= $C_{10}$ alkyl methacrylate (isodecyl methacrylate)

The following Table 10 shows the composition of Formulations (a1) to (f2), each comprising one of the polyalkyl (meth)acrylates as presented in Table 5 and a base oil, which were formulated to a $KV_{40}$ of about 46 mm²/s. As apolar base oil was used a mixture of NB 3043 (Group III base oil with a $KV_{100}$ of 4.3 cSt) and NB 3080 (Group III base oil with a $KV_{100}$ of 7.9 cSt).

TABLE 10

Additive compositions prepared by using the polymers presented in Table 9

| | Product | | Oils | |
|---|---|---|---|---|
| Formulation # | Polymer # | Treat rate [%] | NB 3043 [%] | NB 3080 [%] |
| (a1) | (a) | 3.7 | 22.5 | 73.8 |
| (b1) | (b) | A formulation was not possible as polymer (b1) could not be dissolved. | | |
| (c1) | (c) | 3.5 | 37.0 | 59.5 |
| (d1) | (d) | 3.7 | 38.0 | 58.3 |
| (e1) | (e) | 16.7 | 42.3 | 41.0 |
| (f1) | (f) | 7.2 | 34.8 | 58.0 |

The effect of the different polyalkyl(meth)acrylates on the demulsibility is presented in Table 11 as the "Time to Demuls". Additionally, $KV_{100}$ and viscosity index (VI) of the formulations are also given.

TABLE 11

Formulation properties of the additive compositions as presented in Table 10

| | Formulation Properties | | | |
|---|---|---|---|---|
| Formulation # | $KV_{40}$ [cSt] | $KV_{100}$ [cSt] | VI | Time to Demuse [min] |
| (a1) | 46.2 | 9.1 | 181 | >30 |
| (b1) | — | — | — | — |
| (c1) | 46.6 | 9.1 | 181 | >30 |
| (d1) | 46.4 | 9.0 | 180 | >30 |
| (e1) | 46.5 | 9.1 | 180 | >30 |
| (f1) | 45.9 | 9.0 | 181 | >30 |

Polymer (a) contains too much HPMA and MMA and provides therefore a very poor demulsibility performance. Polymer (b) is incompatible with the oil mixture which may be attributed to the formation of gel-like polymer during the polymerization procedure. Group III base oils react more sensitive to such poorly soluble crosslinked polymer chains than Group I base oils which are better solvents.

Formulation (a1) containing polymer (a) which is produced in a similar way was already hazy, but due to the higher molecular weight the required treat rate in the formulation was significantly lower and the haze did not settle. Hydroxy-functional methacrylates are known to contain a certain amount of dimethacrylates produced via esterification of the free hydroxy function. These dimethacrylates favor the formation of gelled polymers.

Despite an amount of HPMA in the range as claimed in this invention formulations (c1) and (d1) showed no sign of phase separation in the demulsibility test which can probably be attributed to the poor balance of the composition with regard to the polar monomers HPMA and styrene.

Whilst the oil compatibility of polymer (e) is excellent, the HEMA content is too high to reach a good demulsibility performance.

Formulation (f1) containing polymer (f) also showed a very poor demulsibility performance which can be correlated to the relatively high molecular weight.

The invention claimed is:

1. A polyalkyl(meth)acrylate polymer, comprising:
   (a) 0% to 8% by weight of methyl (meth)acrylate;
   (b) 1.5% to 4.5% by weight of a hydroxyl-substituted $C_{1-4}$ alkyl (meth)acrylate; and
   (c) 87.5% to 98.5% by weight of at least one $C_{6-30}$ alkyl (meth)acrylate, wherein
   the polyalkyl(meth)acrylate polymer has a weight-average molecular weight $M_w$ in the range of 30,000 to 130,000 g/mol.

2. The polyalkyl(meth)acrylate polymer according to claim 1, comprising:
   (a) 2% to 8% by weight, of methyl (meth)acrylate;
   (b) 1.9% to 4.0% by weight, of a hydroxyl-substituted $C_{1-4}$ alkyl (meth)acrylate; and
   (c) 88.0% by weight to 96.1% by weight of at least one $C_{6-30}$ alkyl (meth)acrylate.

3. The polyalkyl(meth)acrylate polymer according to claim 1, having a weight-average molecular weight $M_w$ in the range of 40,000 to 100,000 g/mol.

4. The polyalkyl(meth)acrylate polymer according to claim 1, having a weight-average molecular weight $M_w$ in the range of 50,000 and 70,000 g/mol.

5. An additive composition, comprising:
(A) at least one apolar base oil selected from the group consisting of API Group II oils and API Group III oils and mixtures thereof, and
(B) the polyalkyl(meth)acrylate polymer of claim 1.

6. The additive according to claim 5, wherein the polyalkyl(meth)acrylate polymer (B) comprises:
(a) 2% to 8% by weight, of methyl (meth)acrylate;
(b) 1.9% to 4.0% by weight, of a hydroxyl-substituted $C_{1-4}$ alkyl (meth)acrylate; and
(c) 88.0% by weight to 96.1% by weight of at least one $C_{6-30}$ alkyl (meth)acrylate.

7. The additive composition according to claim 5, wherein component (A) is present in an amount of 20% to 45% by weight and the polyalkyl(meth)acrylate polymer (B) is present in an amount of 55% to 80% by weight, based on a total weight of the composition.

8. The additive composition according to claim 5, wherein component (A) is present in an amount of 25% to 40% by weight and the polyalkyl(meth)acrylate polymer (B) is present in an amount of 60% to 75% by weight, based on a total weight of the composition.

9. A lubricating oil composition, comprising:
(A) 84% to 97% by weight of at least one apolar base oil selected from the group consisting of API Group II oils and API Group III oils and mixtures thereof;
(B) 30% to 16% by weight of the polyalkyl(meth)acrylate polymer of claim 1; and
(C) optionally one or more further additives.

10. The lubricating oil composition according to claim 9, wherein the polyalkyl(meth)acrylate polymer (B) comprises:
(a) 2% to 8% by weight, of methyl (meth)acrylate;
(b) 1.9% to 4.0% by weight, of a hydroxyl-substituted $C_{1-4}$ alkyl (meth)acrylate; and
(c) 88.0% by weight to 96.1% by weight of at least one $C_{6-30}$ alkyl (meth)acrylate.

11. The lubricating oil composition according to claim 9, wherein the one or more further additives (C) are present and are one or more selected from the group consisting of pour point depressants, dispersants, defoamers, detergents, demulsifiers, antioxidants, antiwear additives, extreme pressure additives, friction modifiers, anticorrosion additives, dyes and mixtures thereof.

12. A method of improving a VI and a demulsibility performance of a lubricating oil composition based on an apolar base oil, the method comprising:
applying a polyalkyl(meth)acrylate polymer according to claim 1 to a lubricating oil composition in need thereof.

13. A method of improving a VI and a demulsibility performance of a lubricating oil composition based on an apolar base oil, the method comprising:
applying an additive composition according to claim 5 to a lubricating oil composition in need thereof.

14. The polyalkyl(meth)acrylate polymer according to claim 1, wherein the hydroxyl-substituted $C_{1-4}$ alkyl (meth)acrylate comprises at least one selected from the group consisting of hydroxyethyl (meth)acrylate (HEMA) and hydroxypropyl (meth)acrylate (HPMA).

15. The additive composition according to claim 5, wherein the hydroxyl-substituted $C_{1-4}$ alkyl (meth)acrylate is selected from the group consisting of hydroxyethyl (meth)acrylate (HEMA) and hydroxypropyl (meth)acrylate (HPMA).

16. The lubricating oil composition according to claim 9, wherein the hydroxyl-substituted $C_{1-4}$ alkyl (meth)acrylate is selected from the group consisting of hydroxyethyl (meth)acrylate (HEMA) and hydroxypropyl (meth)acrylate (HPMA).

17. The lubricating oil composition according to claim 9, having a VI of from 150 to 250.

18. The lubricating oil composition according to claim 9, wherein the time to demulse of said lubricating oil composition is 9 minutes or less.

19. The polyalkyl(meth)acrylate polymer according to claim 1, wherein weight percent amounts of components (a), (b), and (c) add up to 100% of a total weight of the polyalkyl(meth)acrylate polymer.

20. The additive composition according to claim 5, wherein weight percent amounts of components (a), (b), and (c) add up to 100% of a total weight of the polyalkyl(meth)acrylate polymer.

21. The lubricating oil composition according to claim 9, wherein weight percent amounts of components (a), (b), and (c) add up to 100% of a total weight of the polyalkyl(meth)acrylate polymer.

22. The polyalkyl(meth)acrylate polymer according to claim 1, wherein the hydroxyl-substituted $C_{1-4}$ alkyl (meth)acrylate is hydroxyethyl (meth)acrylate (HEMA).

* * * * *